United States Patent
Langenhoff et al.

[11] 3,895,097
[45] July 15, 1975

[54] PROCESS FOR REACTING CARBON, SILICON OR METAL OXIDES AND CHLORINE

[75] Inventors: Ferdinand Langenhoff, Ranzel; Erich Termin, Laufenburg; Otto Bleh, Bergheimsieg; Rico Kolb, Ranzel, all of Germany

[73] Assignee: Dynamit Nobel AG, Troisdorf, Germany

[22] Filed: Mar. 21, 1973

[21] Appl. No.: 343,579

Related U.S. Application Data
[62] Division of Ser. No. 91,408, Nov. 20, 1970, Pat. No. 3,753,660.

[30] Foreign Application Priority Data
Sept. 16, 1969 Germany.......................... 1946718

[52] U.S. Cl. ............. 423/341; 423/415; 423/492; 423/659
[51] Int. Cl.. C01g 31/00; C01g 23/02; C01g 25/04; C01b 33/08
[58] Field of Search .......... 423/659, 492, 341, 342, 423/415; 23/277 R

[56] References Cited
UNITED STATES PATENTS

| | | | |
|---|---|---|---|
| 3,124,425 | 3/1964 | Richelsen...................... | 423/492 X |
| 3,228,751 | 1/1966 | Irani................................ | 423/492 X |
| 3,293,005 | 12/1966 | McCord............................ | 423/492 |
| 3,753,660 | 8/1973 | Langenhoff et al............... | 23/277 R |
| 3,754,073 | 8/1973 | Langenhoff et al............... | 423/492 X |
| 3,755,547 | 8/1973 | Langenhoff et al............... | 423/492 X |

Primary Examiner—Edward Stern
Attorney, Agent, or Firm—Burgess, Dinklage & Sprung

[57] ABSTRACT

In a tubular reactor carrying a bed of solid material into which carbon electrodes project for heating the material upon passage of a current, the outside ends of said electrodes being connected to metallic conductors in turn connected to a supply of current, the invention involves pouring lead about the end of each electrode to effect improved contact between the electrode and its respective metallic conductor. The process involving use of such electrodes to react carbon with chlorine and the oxide of silicon or metals such as vanadium, titanium or zirconium is also covered.

6 Claims, 1 Drawing Figure

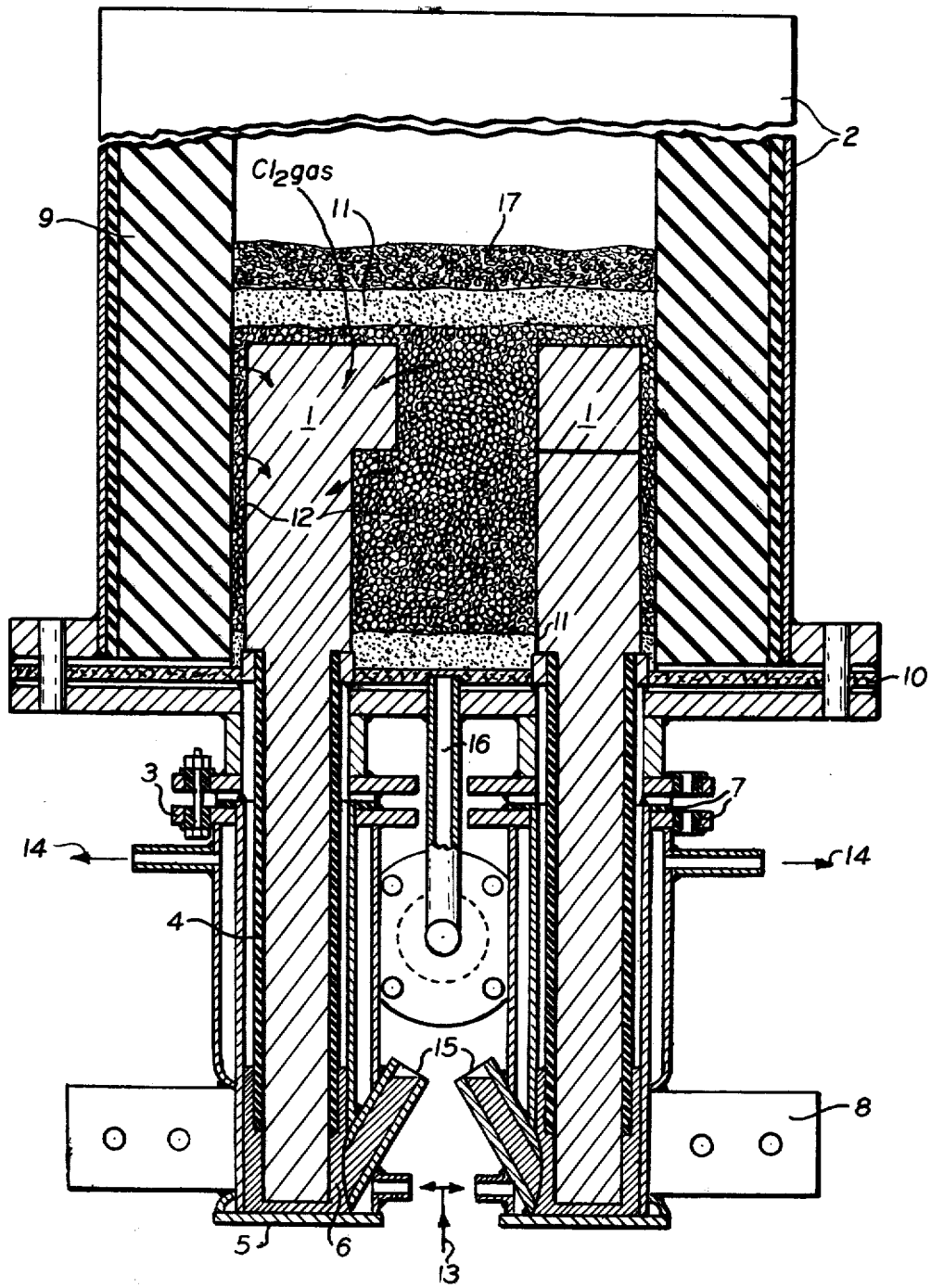

PROCESS FOR REACTING CARBON, SILICON OR METAL OXIDES AND CHLORINE

This is a division of application Ser. No. 91,408, filed Nov. 20, 1970, now U.S. Pat. No. 3,753,660.

The invention relates to electrically heated tubular reactors.

It is known to effect chemical reactions in tubular reactors wherein heating is effected electrically. For example, a quartz resistance coil has been positioned inside such a reactor and a current passed therethrough to heat up the coil and, thereby, the materials within the reactor. After a time, however, the quartz becomes brittle. Moreover, the quartz is not sufficiently resistant to mechanical stresses. Finally, while quartz may be useful in many applications will not stand up in the case of long term use in the presence of carbon.

Attempts to use carbon electrodes to heat such reactors have not proven satisfactory, especially where chlorine is present, due to the difficulty of maintaining good contact between the carbon and a metal conductor. The carbon electrodes being porous and permeable to chlorine, it has not been possible heretofore to provide proper electric contact from carbon to metal. After a time, contact would be lost, probably through corrosive action of chlorine on the metal. Attempts to maintain contact by using chlorineresistant metals such as nickel or silver as contact metal have been unsuccessful, as have attempts to render the electrodes impermeable to chlorine by impregnating with waxes, resins etc. Impregnation with lead salt solutions, disclosed in Russian Pat. No. 197,529, has also not been successful.

It is accordingly an object of the present invention to provide an electric heating system for a tubular reactor which is efficient, long lived and simple.

It is a further object of the invention to provide a carbon electrode for an electric heating system for tubular reactors which is so connected as to be usable even in the presence of chlorine.

These and other objects and advantages of the invention are realized in accordance with the present invention which relates to an electric heating system for tubular reactors, used particularly for reacting metal oxides or silicates with chlorine in the presence of carbon, which system is characterized by carbon electrodes extending through gas-permeable electrically insulating inert layers and projecting into a bed of carbon surmounted by a porous insulating layer of inert material which forms a base onto which a solid reactant can be placed, the lower ends of the electrodes being encased by cast lead into a contact head.

Advantageously the electrode shaft is surrounded by a refractory chlorine-resistant electrically insulating tube extending down into the area cast about with lead. The tops of the electrodes may appropriately be rounded or beveled on one or both sides.

The invention will now be described more particularly with reference to the accompanying drawing which is a truncated vertical section through the tubular reactor.

Referring now more particularly to the drawing, carbon electrodes 1 are so arranged in the lower part of a reactor 2 as to provide a sufficient distance between the electrodes. The distance will depend on the reactor diameter and, in the preferred embodiment, is about 30 to 40 cm using a reactor which has an internal diameter or about 70 cm and a height of about 2.5 m, i.e. a height:width ratio of almost 4. The diameter can be as small as 20 cm in which case the electrode spacing may be only 15 cm or less, or with larger reactors the spacing may be 100 cm or more, all other dimensions being similarly scaled up.

Preferably the electrode head is not cylindrical but rather is square, rounded, or beveled on one or both sides since then the spacing between electrodes can be varied by rotating the electrodes about their axes. As shown in the drawing, the ends of the electrodes 1 are angled and one is turned 90° relative to the other.

The electrode portion below the head to above the electrode flange 3 is provided with a refractory chlorine-resistant electrically insulated tube 4 which may be quartz, glass, quartz ware or the like. The bottom ends of the electrodes and of tubes 4 are embedded in lead in water-cooled contact heads 5. The lead seal 6, surprisingly enough, has proved the optimal solution to the problem of electric carbon-to-metal contact under the action of chlorine.

The contact head is electrically insulated from the reactor floor by using an electrically insulating gasket and electrically insulating bushing washers 7.

A silvered copper bar 8 is welded to the contact head, establishing contact with the source of electric current. The reaction chamber generally has a refractory and electrically insulating liner 9. Electrical insulation is required in any event to avoid misrouting of the electric current. In a surface heating system of fairly large diameter, a plurality of pairs of electrodes arranged crosswise may be used. The insulation from the reactor floor is provided by an asbestos packing 10 and for example fusible corundum fills 11 about 3 cm deep (grain size 3–5 mm). Fills of MgO, ZrO$_2$, SiO$_2$ or the like may also be used.

The space between electrodes is filled with carbon 12. Since disintegration of brittle fragments may give rise to cavities which might interrupt the flow of current, whereas round particles will roll together and function reliably, spheroidal graphite has been found best as the material making up the carbon bed. Besides, the balls provide excellent chlorine gas circulation and distribution as the gas required for the reaction passes through the bed. The bed of graphite spheres 12 is surmounted by another insulating layer 11 which form a floor of the reaction chamber of the reactor. Onto this layer there is supplied intermittently or continuously (by means not shown) a mixture of very fine grained solid reactants, e.g. vanadium pentoxide and carbon powders, which react with the gas passing through the reactor. The bed of solid reactants 17 is relatively shallow, e.g. about 5 to 30 cm, which permits careful control of the temperature of the reaction, i.e. the high temperatures are required over a relatively large area but only a short distance vertically.

The reactor is also provided, as shown, with inlets 13 and outlets 14 for cooling water adjacent the lead seals, as well as with pouring spouts 15 for molten lead, and an inlet pipe 16 for chlorine gas.

The drawing shows the gas passing upwardly through a vertical reactor, but with appropriate modification the gas could pass downwardly or the reactor could even be horizontal.

In the special case to which this invention is chiefly addressed, energy is supplied to a system subject to temperature fluctuations and steady loads from about 200° to 1300°C. In addition, the system is exposed to severe chemical stress, since these temperatures are to be maintained in the presence of chlorine, carbon and reaction gases such as for example $VOCl_3$, $TiCl_4$, $ZrCl_4$, $SiCl_4$, $CO$, $CO_2$, $COCl_2$, etc., that is to say, reducing and oxidizing agents at the same time.

Specifically, the object is to carry out reductive chlorination reactions and to produce chlorides in accordance with the following equations, by way of example:

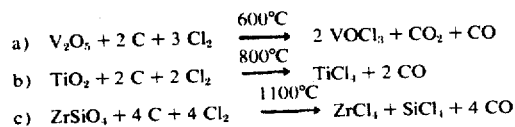

a) $V_2O_5 + 2 C + 3 Cl_2 \xrightarrow{600°C} 2 VOCl_3 + CO_2 + CO$ b) $TiO_2 + 2 C + 2 Cl_2 \xrightarrow{800°C} TiCl_4 + 2 CO$ c) $ZrSiO_4 + 4 C + 4 Cl_2 \xrightarrow{1100°C} ZrCl_4 + SiCl_4 + 4 CO$ The heating system must be inside the reactor and sealed off gastight from the outside atmosphere without interfering with the flow of current. Besides, there must be complete electrical insulation from the metal shell of the reactor. The illustrated reactions are not true fluidized bed reactions but merely quasi-fluidized bed reactions since the gas flow velocities are not very high.

The invention will be further described in the following illustrative examples.

EXAMPLE I

A chlorination process to produce $VOCl_3$ according to equation (a) was carried out using a heating system according to the drawing in a reactor 600 mm in diameter and about four times as high. The electrodes were spaced apart about 35 cm and the inert layers 11 were magnesia particles, larger than 3 mm, and about 4 cm high. Powdered $VOCl_3$ and carbon reactants were supplied intermittently to maintain a layer of about 5 to 30 cm thickness. The electrodes were supplied with alternating current at 10 V and 160 A; after 3 hours, the temperature of the reaction chamber was 500°C. The heating system was switched off and on again on several occasions and the process ran smoothly for half a year.

EXAMPLE II

In a reactor 300 mm in diameter, a chlorination reaction according to equation (c) was carried out. The electrodes were energized with 10 V and 1,000 A alternating current. After 4 hours, the temperature of the reaction chamber was 1,000°C. After 4 weeks of operation, only insignificant manifestations of use were perceptible in the bed and on the electrodes.

It will be appreciated that the instant specification and examples are set forth by way of illustration and not limitation and that various modifications and changes may be made without departing from the spirit and scope of the present invention.

What is claimed is:

1. In the process for producing a metal or silicon chloride by reaction between a solid bed comprising a mixture of an oxide of said metal or silicon plus carbon in a tubular reactor made of refractory chlorine-resistant material and chlorine gas supplied to said reactor by heat generated through passage of an electric current between the ends of spaced carbon electrodes located below said bed, the other ends of said electrodes extending outside said reactor and being connected to metallic conductors which in turn are connected to a supply of electric current, the improvement which comprises effecting an improved flow of current to said electrodes by connecting each of them to its respective metallic conductor through a body of lead, and surrounding each electrode along its entire length from a location inside said reactor towards the outside electrode end with a gas-tight tube of refractory electrically insulated material terminating inside siad body of lead.

2. Process according to claim 1, wherein the space between the ends of the electrodes within said reactor is filled with spheroidal graphite, an inert porous layer separating the spheroidal graphite from the bed of solid reactants thereabove.

3. Process according to claim 1, wherein said oxide comprises an oxide of vanadium and the reaction product comprises vanadium chloride.

4. Process according to claim 1, wherein said oxide comprises an oxide of titanium and the reaction product comprises titanium chloride.

5. Process according to claim 1, wherein said oxide comprises an oxide of zirconium and the reaction product comprises zirconium chloride.

6. Process according to claim 1, wherein said oxide comprises an oxide of silicon and the reaction product comprises silicon chloride.

* * * * *